(12) United States Patent
Charlas et al.

(10) Patent No.: US 11,607,853 B2
(45) Date of Patent: Mar. 21, 2023

(54) REPAIR OR RESUMPTION OF MANUFACTURE OF A COMPOSITE MATERIAL PART WITH FIBROUS THREE-DIMENSIONAL WOVEN REINFORCEMENT

(71) Applicant: SAFRAN AIRCRAFT ENGINES, Paris (FR)

(72) Inventors: Mathieu Julien Charlas, Moissy-Cramayel (FR); Adrien Francis Paixao, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 105 days.

(21) Appl. No.: 17/431,565

(22) PCT Filed: Feb. 18, 2020

(86) PCT No.: PCT/HR2020/050298
§ 371 (c)(1),
(2) Date: Aug. 17, 2021

(87) PCT Pub. No.: WO2020/169920
PCT Pub. Date: Aug. 27, 2020

(65) Prior Publication Data
US 2022/0134690 A1 May 5, 2022

(30) Foreign Application Priority Data
Feb. 18, 2019 (FR) ........................................ 1901607

(51) Int. Cl.
*F01D 25/24* (2006.01)
*B29C 73/06* (2006.01)
(Continued)

(52) U.S. Cl.
CPC .............. *B29C 73/06* (2013.01); *B29C 70/24* (2013.01); *F01D 25/24* (2013.01);
(Continued)

(58) Field of Classification Search
CPC ......... F01D 25/24; F01D 5/005; B29C 73/06; B29C 73/14; B29C 73/04; B29C 73/24;
(Continued)

(56) References Cited

U.S. PATENT DOCUMENTS 8,058,191 B2 * 11/2011 Campbell .............. D03D 11/00
442/205
8,322,971 B2   12/2012 Coupe et al.
(Continued)

FOREIGN PATENT DOCUMENTS

EP    2 345 532 A2    7/2011
EP    2 474 477 A1    7/2012
(Continued)

OTHER PUBLICATIONS

International Search Report as issued in International Patent Application No. PCT/FR2020/050298, dated Jun. 22, 2020.

*Primary Examiner* — Igor Kershteyn
(74) *Attorney, Agent, or Firm* — Pillsbury Winthrop Shaw Pittman LLP (57) ABSTRACT

A method for repairing a part made of composite material includes producing a recessed section by removing the composite material at a damaged area, producing grooves extending on the two faces of the part from edges of the recessed section, producing orifices in the part opening out into the grooves, tree-dimensional weaving of a filling part fiber preforms including a central section having a shape corresponding to the shape of the recessed section and fiber bundles extending from the central section, placing the filling preforms respectively on either face of the part with
(Continued)

the fiber bundles in the grooves on the faces of the part and in the orifices such that the fiber bundles open out into the grooves present on the opposite face of the part, impregnating the filling fiber preforms with a precursor resin of a matrix, transforming the resin into a matrix to obtain a filling part.

15 Claims, 9 Drawing Sheets

(51) Int. Cl.
  *B29C 70/24* (2006.01)
  *B29C 73/26* (2006.01)
(52) U.S. Cl.
  CPC .. *B29C 2073/264* (2013.01); *F05D 2220/323* (2013.01); *F05D 2230/80* (2013.01); *F05D 2300/6034* (2013.01)
(58) Field of Classification Search
  CPC ............... B29C 73/26; F05D 2220/323; F05D 2220/36; F05D 2230/80; F05D 2240/14; F05D 2300/6034; B64F 5/40
  See application file for complete search history.

(56) References Cited

U.S. PATENT DOCUMENTS

| | | | | |
|---|---|---|---|---|
| 8,576,392 | B2* | 11/2013 | Johnston | G01M 5/0033 356/73.1 |
| 9,193,433 | B2* | 11/2015 | Hugon | B29C 66/112 |
| 9,817,923 | B2* | 11/2017 | Marchal | G06F 30/00 |
| 10,995,037 | B1* | 5/2021 | Apostolov | C04B 35/62876 |
| 11,021,813 | B2* | 6/2021 | Mathon | D03C 3/24 |
| 2005/0146076 | A1* | 7/2005 | Alexander | B29C 70/24 264/257 |
| 2007/0095457 | A1 | 5/2007 | Keller et al. | |
| 2010/0144227 | A1 | 6/2010 | Coupe et al. | |
| 2012/0080135 | A1 | 4/2012 | Evens et al. | |
| 2015/0185128 | A1 | 7/2015 | Chang et al. | |
| 2017/0057668 | A1* | 3/2017 | Ashmawi | B29C 73/22 |

FOREIGN PATENT DOCUMENTS

| | | |
|---|---|---|
| EP | 3 090 859 A1 | 11/2016 |
| FR | 3 008 021 A1 | 1/2015 |

* cited by examiner

REPAIR OR RESUMPTION OF MANUFACTURE OF A COMPOSITE MATERIAL PART WITH FIBROUS THREE-DIMENSIONAL WOVEN REINFORCEMENT

CROSS-REFERENCE TO RELATED APPLICATIONS

This application is the U.S. National Stage of PCT/FR2020/050298, filed Feb. 18, 2020, which in turn claims priority to French patent application number 1901607 filed Feb. 18, 2019. The content of these applications are incorporated herein by reference in their entireties.

TECHNICAL FIELD

The invention relates to the repair of parts made of composite material which comprise a fiber reinforcement obtained by three-dimensional weaving densified by a matrix.

PRIOR ART

The composite material parts comprising a reinforcement obtained by three-dimensional weaving have the advantage of having a "non-delaminable" nature compared to the composite material parts whose fiber reinforcement is obtained by stacking or draping of two-dimensional fiber plies.

The composite material parts produced from two-dimensional fiber plies are easily repairable because the plies are separable and can therefore be replaced with new sound plies in case of damage. Examples of solutions to repair composite material parts are described in particular in documents US 2015/0185128, US 2012/0080135 and US 2007/0095457. These known solutions consist in sticking a pre-impregnated fiber patch on the damaged area or the area to be resumed of the composite material part, the patch possibly consisting of one or several fiber plies. However, this type of solution presents a risk of delamination of the stuck patch and is therefore not desirable for the repair of composite material parts with three-dimensional fiber reinforcement because the material would then lose its "non-delaminable" nature.

However, there is a need for a solution to repair composite material parts with three-dimensional fiber reinforcement which does not alter the resistance to delamination initially presented by the material.

DISCLOSURE OF THE INVENTION

To this end, the invention proposes a method for repairing a part made of composite material comprising a fiber reinforcement having a three-dimensional weaving between a plurality of warp yarns and a plurality of weft yarns, said fiber reinforcement being densified by a matrix, characterized in that it comprises:
the identification of at least one damaged area in the part,
the production of a recessed section by removal of the composite material at the damaged area so as to form a recessed section extending from a first face of the composite material part to a second face of said part,
the production of a first plurality of grooves extending on the first face of the composite material part from the edge(s) of the recessed section,
the production of a second plurality of grooves extending on the second face of the composite material part from the edge(s) of the recessed section,
the production of a plurality of orifices within the thickness of the composite material part, each orifice opening out both into a groove of the first plurality of grooves and into a groove of the second plurality of grooves,
the tree-dimensional weaving of at least one filling part fiber preform comprising a central section having a shape corresponding to the shape of the recessed section of the composite material part and a plurality of fiber bundles extending from the central section,
the placement of the central section of the filling part fiber preform in the free volume of the composite material part delimited by the recessed section,
the placement of a first portion of the fiber bundles of said at least one preform in the grooves of the first plurality of grooves present on the first face of the part and in the orifices of the plurality of orifices such that the fiber bundles of the first portion of fiber bundles of said at least one preform open out into the grooves of the second plurality of grooves,
the placement of a second portion of the fiber bundles of said at least one preform in the grooves of the second plurality of grooves present on the second face of the part and in the orifices of the plurality of orifices such that the fiber bundles of the second portion of fiber bundles of said at least one preform open out into the grooves of the first plurality of grooves,
the impregnation of said at least one fiber preform with a precursor resin of a matrix,
the transformation of the resin into a matrix in order to obtain a filling part made of composite material comprising a fiber reinforcement densified by a matrix, said filling part occupying the volume defined by the recessed section.

By using a filling part comprising at least one preform having a central section with a three-dimensional weaving which is mechanically attached to the part by fiber bundles, it is possible to perform repairs that have high resistance to delamination. The repair of a damaged area in the composite material part according to the invention is therefore particularly robust.

According to a first characteristic of the method of the invention, the repair method comprises:
the tree-dimensional weaving of a first filling part fiber preform comprising a central section having a shape corresponding to the shape of the recessed section on the side of the first face of the composite material part and a plurality of fiber bundles extending from the central section,
the tree-dimensional weaving of a second filling part fiber preform comprising a central section having a shape corresponding to the shape of the recessed section on the side of the second face of the composite material part and a plurality of fiber bundles extending from the central section,
the placement of the central section of the first filling part fiber preform in a portion of the free volume of the composite material part delimited by the recessed section and present on the side of the first face of the part and of the fiber bundles in the grooves of the first plurality of grooves present on the first face of the part and in the orifices of the plurality of orifices such that the fiber bundles of the first preform open out into the grooves of the second plurality of grooves, the placement of the central section of the second filling part fiber preform in another portion of the free volume of the composite material part delimited by the recessed section and present on the side of the second face of the part and of the fiber bundles in the grooves of the second plurality of grooves present on the second face of the part and in the orifices of the plurality of orifices such that the fiber bundles of the second preform open out into the grooves of the first plurality of grooves, According to a second characteristic of the method of the invention, the production of the recessed section comprises the formation of several facing edges each comprising first and second bevels, the central section of the first filling part fiber preform having a geometry complementary to a portion of the volume of the recessed section defined between the first bevels of the facing edges and the central section of the second filling part fiber preform having a geometry complementary to the other portion of the volume of the recessed section defined between the second bevels of the facing edges. This allows optimizing the transmission of the mechanical loads on the bonding interface between the filling part and the composite material structure of the part to be repaired.

According to a third characteristic of the method of the invention, the recessed section has a polygonal shape, the grooves of the first plurality of grooves each extending from a vertex of the polygon formed by the recessed section on the first face of the composite material part, the grooves of the second plurality of grooves each extending from a vertex of the polygon formed by the recessed section on the second face of the composite material part. This allows obtaining a balanced attachment configuration of each filling part fiber preform and thus reinforcing the holding of the filling part on the composite material part to be repaired.

According to a fourth characteristic of the method of the invention, the first and second pluralities of grooves each comprise main grooves extending from the edges of the recessed section opening out respectively onto the first and second faces of the composite material part and secondary grooves extending from each main groove, at least part of the orifices of the plurality of orifices opening out both into a secondary groove of the first plurality of grooves and into a secondary groove of the second plurality of grooves. It is thus possible to form an attachment network in the form of a "snowflake" for each filling part fiber perform and thus reinforcing the holding of the filling part on the composite material part to be repaired.

According to a fifth characteristic of the method of the invention, the latter further comprises the introduction of the fiber bundles of the first filling part fiber preform into the central section of the second fiber preform and the introduction of the fiber bundles of the second filling part fiber preform into the central section of the first fiber preform. This allows further reinforcing the holding of the fiber preforms on the composite material part and improving the strength of the filling part.

One object of the invention is also a part made of composite material comprising a fiber reinforcement having a three-dimensional weaving between a plurality of warp yarns and a plurality of weft yarns, said fiber reinforcement being densified by a matrix, characterized in that the fiber reinforcement densified by the matrix includes at least one recessed section extending from a first face of the composite material part to a second face of said part and in that a filling part made of composite material is present in the free volume of the composite material part delimited by said at least one recessed section, the composite material part comprising a first plurality of grooves extending on the first face of said part from the edge(s) of the recessed section opening out onto the first face and a second plurality of grooves extending on the second face of said part from the edge(s) of the recessed section opening out onto the second face, the composite material part further comprising a plurality of orifices extending within the thickness of the composite material part, each orifice opening out both into a groove of the first plurality of grooves and into a groove of the second plurality of grooves, the filling part comprising at least one filling part fiber preform comprising a central section present within the volume of the recessed section and a plurality of fiber bundles extending from the central section, the central section of said at least one preform having a three-dimensional weaving, a first portion of the fiber bundles of said at least one fiber preform being present in the grooves of the first plurality of grooves present on the first face of the composite material part and in the orifices of the plurality of orifices such that the fiber bundles of the first portion of fiber bundles of said at least one preform open out into the grooves of the second plurality of grooves, a second portion of fiber bundles of said at least one fiber preform being present in the grooves of the second plurality of grooves present on the second face of the composite material part and in the orifices of the plurality of orifices such that the fiber bundles of the second portion of fiber bundles of said at least one preform open out into the grooves of the first plurality of grooves.

According to a first characteristic of the part of the invention, the filling part comprises first and second filling part fiber preforms each comprising a central section present in a portion of the volume of the recessed section and a plurality of fiber bundles extending from the central section, the central section of each preform having a three-dimensional weaving, the fiber bundles of the first fiber preform being present in the grooves of the first plurality of grooves present on the first face of the composite material part and in the orifices of the plurality of orifices such that the fiber bundles of the first preform open out into the grooves of the second plurality of grooves, the fiber bundles of the second fiber preform being present in the grooves of the second plurality of grooves present on the second face of the composite material part and in the orifices of the plurality of orifices such that the fiber bundles of the second preform open out into the grooves of the first plurality of grooves.

According to a second characteristic of the part of the invention, the recessed section comprises at least two facing edges each comprising first and second bevels, the central section of the first filling part fiber preform having a geometry complementary to a portion of the volume of the recessed section defined between the first bevels of the facing edges and the central section of the second filling part fiber preform having a geometry complementary to the other portion of the volume of the recessed section defined between the second bevels of the facing edges.

According to a third characteristic of the part of the invention, the recessed section has a polygonal shape, the grooves of the first plurality of grooves each extending from a vertex of the polygon formed by the recessed section on the first face of the composite material part, the grooves of the second plurality of grooves each extending from a vertex of the polygon formed by the recessed section on the second face of the composite material part.

According to a fourth characteristic of the part of the invention, the first and second pluralities of grooves each comprise main grooves extending from the edges of the recessed section opening out respectively onto the first and second faces of the composite material part and secondary grooves extending from each main groove, at least one portion of the orifices of the plurality of holes opening out both into a secondary groove of the first plurality of grooves and into a secondary groove of the second plurality of grooves.

According to a fifth characteristic of the part of the invention, the fiber bundles of the first filling part fiber preform extend in the central section of the second fiber preform and the fiber bundles of the second filling part fiber preform extend in the central section of the first fiber preform.

According to a sixth characteristic of the part of the invention, the part corresponds to a casing of an aeronautical gas turbine engine. In this case, one object of the invention is also an aeronautical gas turbine engine having a casing according to the invention, for example a fan casing, as well as an aircraft comprising one or more of these aeronautical engines.

DESCRIPTION OF THE EMBODIMENTS

The invention generally applies to any part made of composite material comprising a fiber reinforcement having a three-dimensional weaving, the reinforcement being densified by a matrix.

The invention will be described below within the non-limiting framework of its application to a fan casing of an aeronautical gas turbine engine. The invention also applies to other composite material parts of aeronautical engines such as, for example, guide vanes also called OGV or inter-vane platforms.

Figure 1:
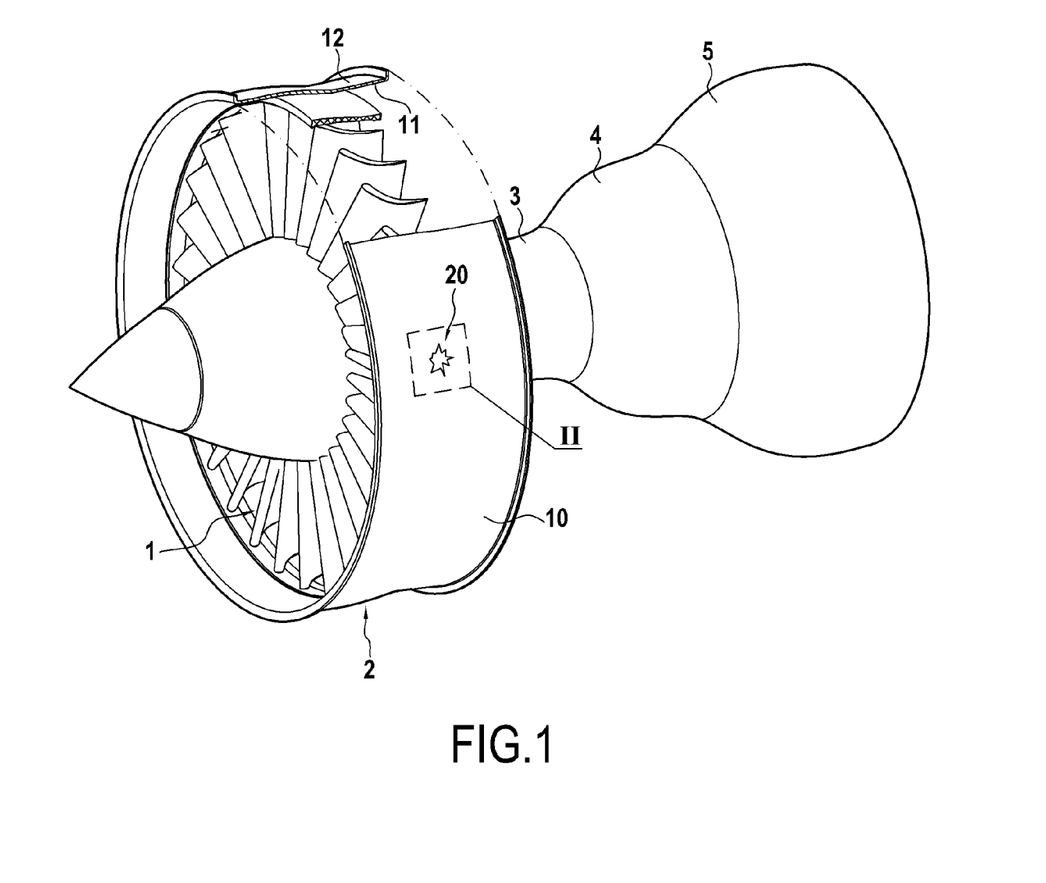
FIG. 1 is a perspective view of an aircraft engine comprising a fan casing.

Such an engine, as shown very schematically in FIG. 1, comprises, from upstream to downstream in the direction of flow of the gas stream, a fan 1 disposed at the inlet of the engine, a compressor 2, a combustion chamber 3, a high-pressure turbine 4 and a low-pressure turbine 5.

The engine is housed inside a casing comprising several portions corresponding to different elements of the engine. Thus, the fan 1 is surrounded by a fan casing 10 having a revolution shape.

The fan casing 10 which is here made of composite material with an organic matrix, that is to say from a fiber reinforcement, for example carbon, glass, aramid or ceramic fiber reinforcement densified by a polymer matrix, for example epoxide, bismaleimide or polyimide. The fiber reinforcement is produced from a strip-shaped fiber texture obtained by three-dimensional weaving in one piece, the texture being shaped by winding on a support tool. The fiber reinforcement thus constituted is then densified by a matrix. The manufacture of such a casing is described in particular in document U.S. Pat. No. 8,322,971. The fan casing made of composite material 10 includes an inner face 11 which defines the air inlet flowpath of the engine and an outer face 12.

Figures 2A, 2B:
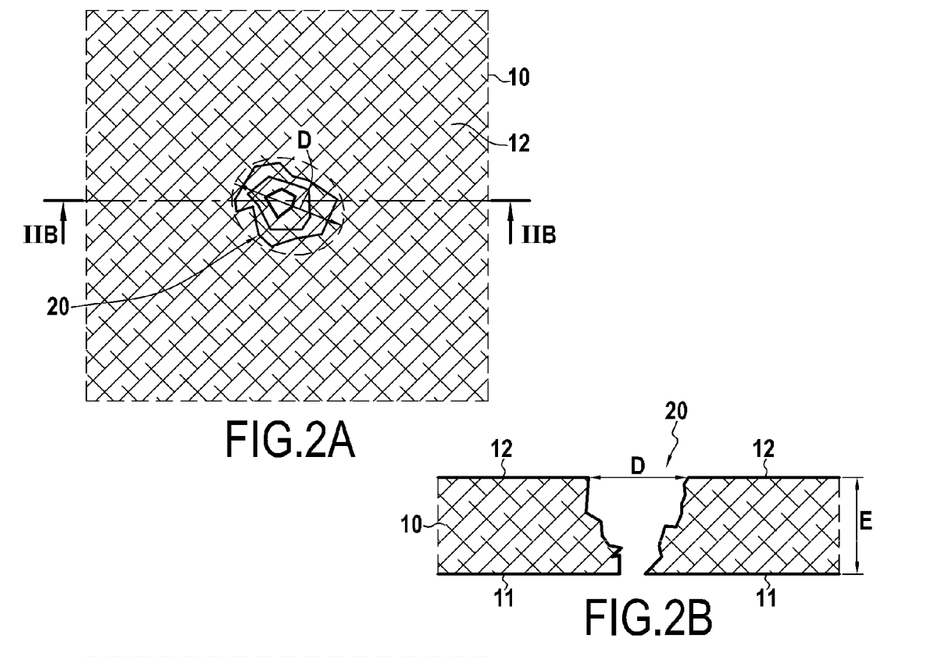
FIG. 2A is a top view of an impact area on the fan casing of the engine of FIG. 1.
FIG. 2B is a radial sectional view of an impact area on the fan casing of the engine of FIG. 1.

In FIGS. 1, 2A and 2B, the casing 10 has a damaged area 20 resulting for example from a blade debris projected onto the inner surface 11 of the casing.

Figures 3A, 3B:
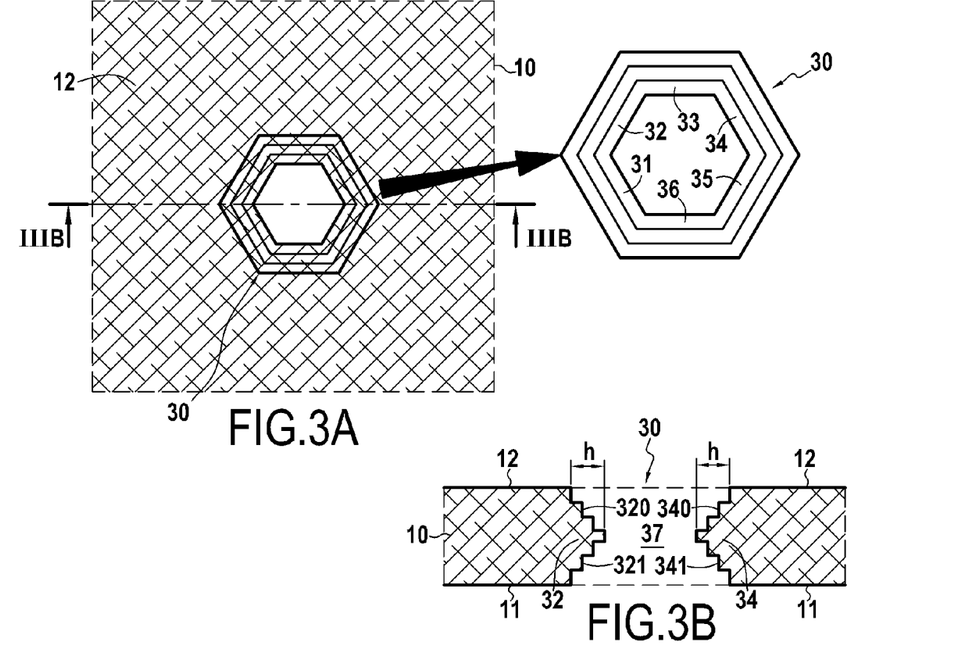
FIG. 3A is a top view showing the production of a recessed section in the fan casing in accordance with one embodiment of the invention.
FIG. 3B is a radial sectional view showing the production of a recessed section in the fan casing in accordance with one embodiment of the invention.

In accordance with the repair method of the invention, the casing is machined at the damaged area 20 in order to remove the affected composite material and prepare the area for repair. The removal of the composite material is carried out on a determined surface of the casing covering at least the area identified as being damaged and over the entire thickness of the casing. As illustrated in FIGS. 3A and 3B, a recessed section 30 which opens out both onto the inner face 11 and onto the outer face 12 of the casing 10 is thus obtained.

In the example described here and according to a particular characteristic of the invention, the recessed section is machined in a polygonal shape with edges 31 to 36 each including two prismatic shapes or bevels of height h having a common vertex. More specifically, the edges 31 to 36 each include respectively a first bevel like the bevels 320 and 340 illustrated in FIG. 3B respectively for the edges 32 and 34 and a second bevel like the bevels 321 and 341 illustrated in FIG. 3B respectively for the edges 32 and 34. The edges can be machined in a staircase shape like in FIG. 3B or in a smooth profile. Each angular ridge has a fillet r not represented in FIG. 3B. The height h of the bevels and the fillet r are determined based on the diameter D of the damaged area 20 and on the thickness E of the composite material to be repaired. The height h is preferably determined such that E/3<h<2E/3. The fillet r is preferably determined such that D/5<r<5D.

The recessed section 30 delimits a free volume of material 37 intended to be occupied by a filling part as explained below.

Once the recessed section 30 is produced, a first plurality of grooves 110 extending on the inner face 11 of the composite material casing is machined from the edges 31 to 36 of the recessed section. Likewise, a second plurality of grooves 120 extending on the outer face 12 of the composite material casing is machined from the edges 31 to 36 of the recessed section. The grooves 110 and 120 are produced on the surface of the composite material part. In the example described here and according to a particular characteristic of the invention, each plurality of grooves comprises main grooves, like the main grooves 1201 to 1206 of the plurality of grooves 120 illustrated in FIG. 4B, which are extended by secondary grooves, such as the secondary grooves 1211 to 1216 illustrated in FIG. 4B. The main grooves extend outwardly of the recessed section from one end contiguous with one of the edges of the recessed section and up to another opposite end from which one or several secondary grooves also extend in a direction directed outwardly of the recessed section. The main and secondary grooves are formed symmetrically on both faces of the composite material part, that is to say a groove of a plurality of grooves on one face of the part is in line with a groove of the plurality of grooves present on the other face of the part.

Figure 4A:
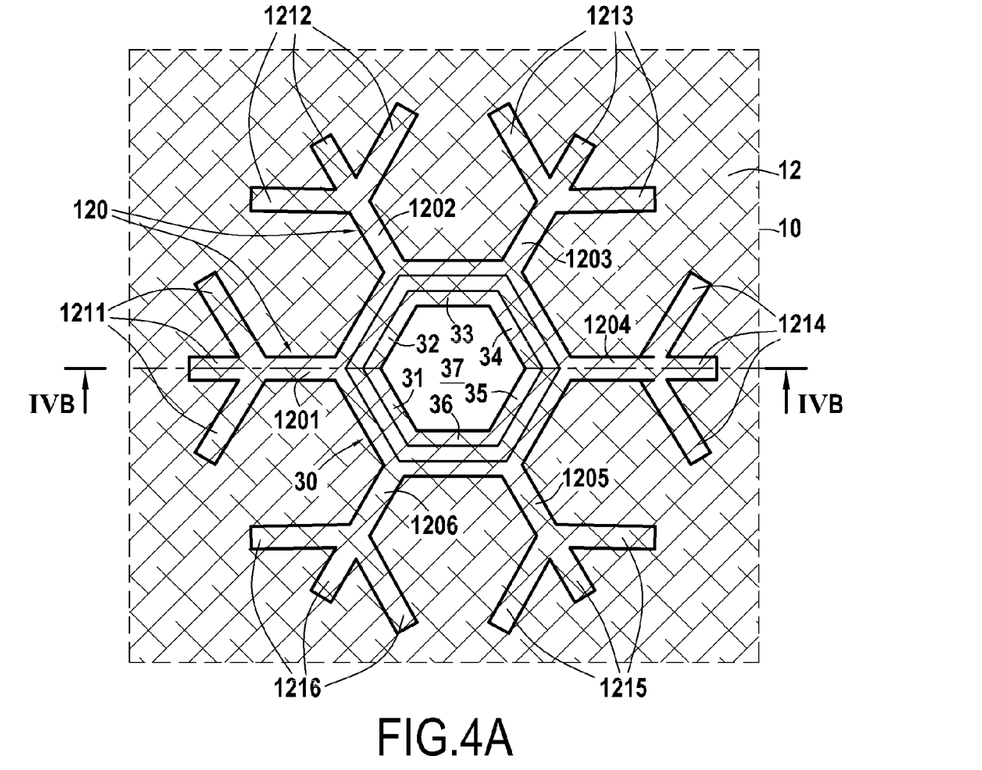
FIG. 4A is a top view representing one face showing the formation on both faces of the fan casing of grooves around the recessed section.
Figure 4B:
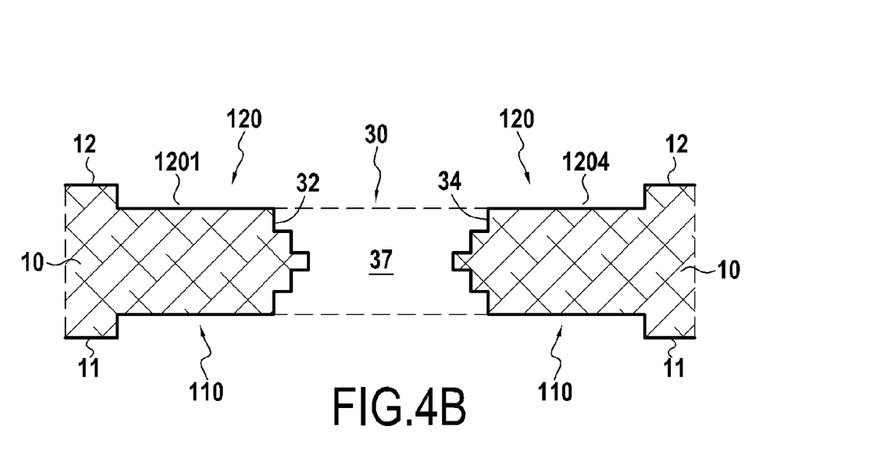
FIG. 4B is a radial sectional view showing the formation on both faces of the fan casing of grooves around the recessed section.

In the example described here, each plurality of grooves present on the two faces of the casing has a snowflake shape with 6 main branches formed by the main grooves and 3 secondary branches at the end of each main branch formed by the secondary grooves. The number of secondary grooves extending each main groove can vary between 0 and 10.

Figure 5A:
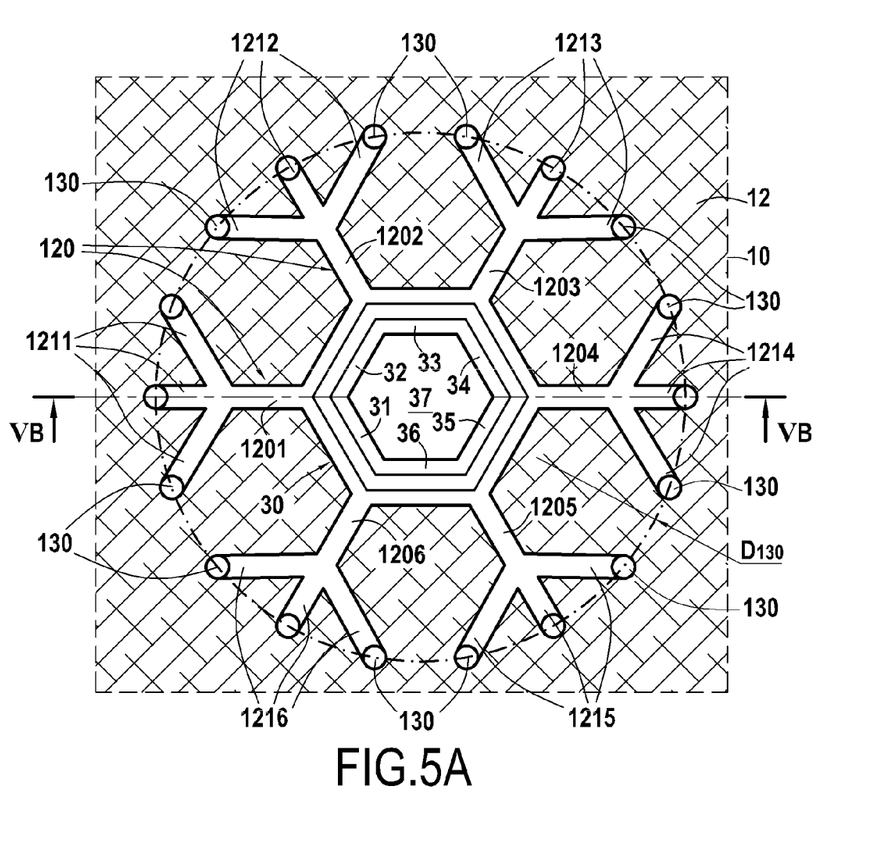
FIG. 5A is a top view representing the face showing the formation of a plurality of orifices in the fan casing opening out into the grooves of FIGS. 4A and 4B.
Figure 5B:
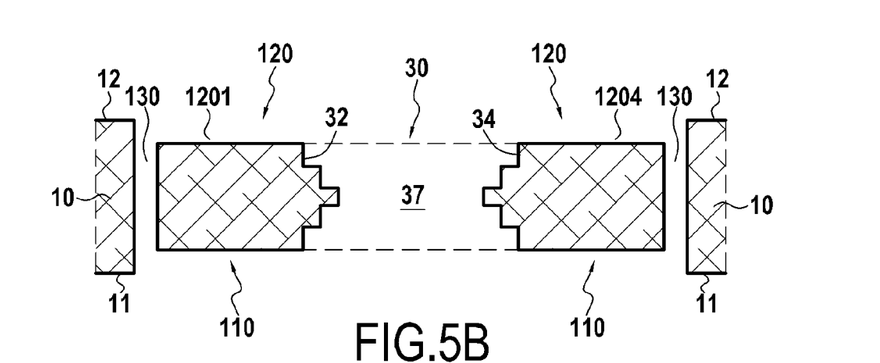
FIG. 5B is a radial sectional view showing the formation of a plurality of orifices in the fan casing opening out into the grooves of FIGS. 4A and 4B.

Once the grooves are produced, a plurality of orifices are formed within the thickness of the composite material part, each orifice opening out both into a groove of the first plurality of grooves and into a groove of the second plurality of grooves. More specifically, in the example described here and as illustrated in FIGS. 5A and 5B, 18 orifices 130 are formed at the secondary grooves 1211 to 1216 present on the outer face 12 and open out into the corresponding secondary grooves present on the inner face 11. In the example described here, the plurality of orifices 130 is distributed along a concentric circle with the center of the recessed section 30 whose diameter $D_{130}$ is determined based on the diameter D of the defect to be repaired such that D<$D_{130}$<5D.

After the various machining operations described above, the surfaces of the part 10 are cleaned and degreased. The purpose of the cleaning is to remove dust and all impurities likely to pollute the surfaces of the part, the cleaning can be carried out in particular by dry and de-oiled air blowing. The degreasing of the surfaces can be carried out using an ethanol or isopropanol type solvent.

Figure 6A:
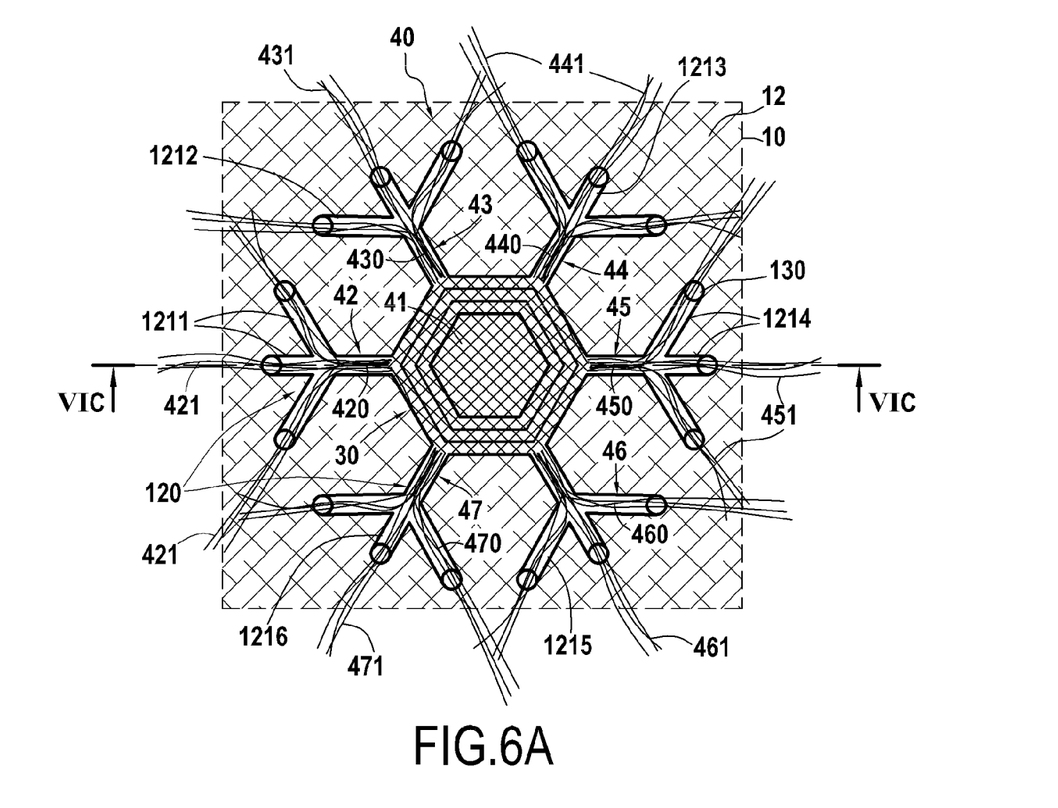
FIG. 6A is a top view representing the outer face showing the set-up of fiber preforms of a filling part.
Figure 6B:
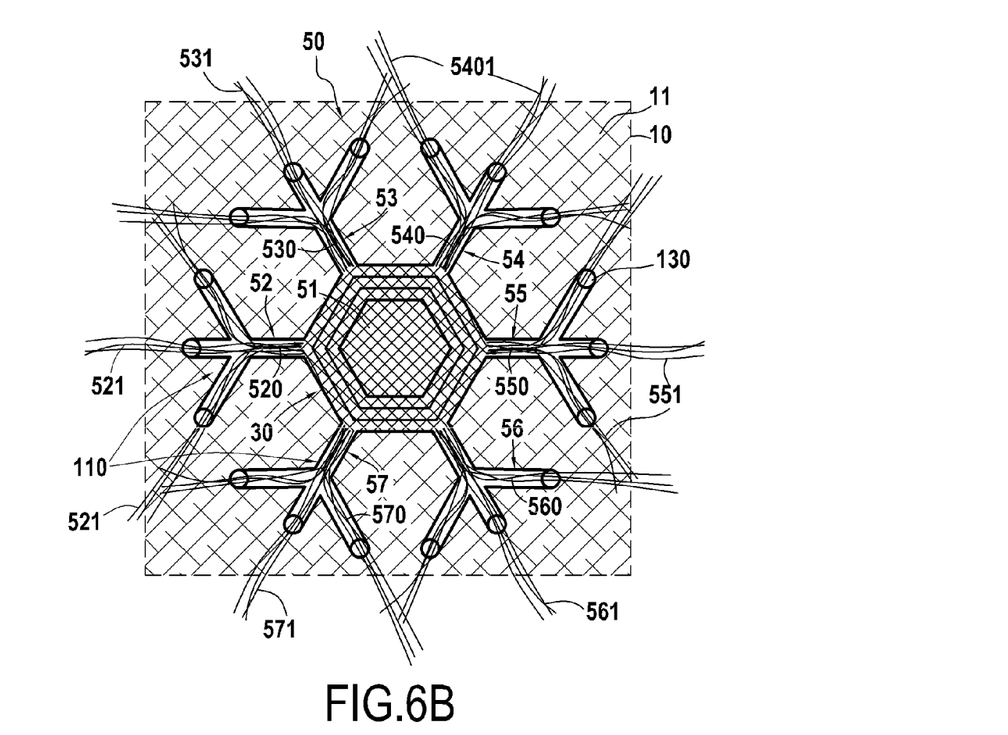
FIG. 6B is a bottom view representing an inner face showing the set-up of fiber preforms of a filling part.
Figure 6C:
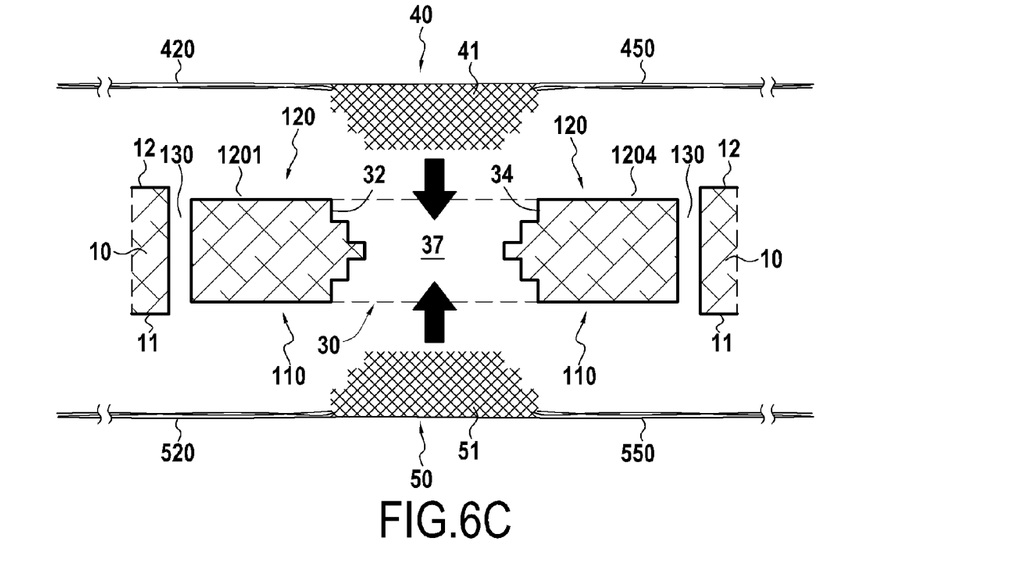
FIG. 6C is a radial sectional view showing the set-up of fiber preforms of a filling part.

Still in accordance with the repair method of the invention, first and second fiber preforms are produced by three-dimensional weaving. As illustrated in FIGS. 6A, 6B and 6C, first and second identical preforms 40, 50 are produced, each comprising a central section 41, 51 from which a plurality of fiber bundles 42 to 47, 52 to 57 extends. The central section 41 of the first preform 40 has a shape corresponding to the shape of the recessed section 30 on the side of the inner face 11 of the casing 10, the central section 41 being intended to fill half of the free volume 37 delimited by the recessed section 30. The central section 51 of the second preform 50 has a shape corresponding to the shape of the recessed section 30 on the side of the outer face 12 of the casing 10, the central section 51 being intended to fill the other half of the free volume 37. The fiber bundles 42 to 47 and 52 to 57 consist of continuous yarns derived respectively from the central sections 41 and 51 which are grouped together in bundles. In the example described here, the fiber bundles 42 to 47 and 52 to 57 respectively include main bundles 420 to 470 and 520 to 570 which are intended to be placed in the main grooves of the plurality of grooves 110 and 120, these main bundles being then subdivided respectively into secondary bundles 421 to 471 and 521 to 571 which are intended to be placed in the secondary grooves as well as in the orifices 130 as explained below. The central sections of the first and second preforms are obtained by three-dimensional weaving between a first plurality of layers of yarns, for example warp yarns, and a second plurality of layers of yarns, for example weft yarns. By "three-dimensional weaving" or "3D weaving" is meant here a weaving mode by which at least some of the yarns of the first plurality of layers of yarns bind yarns of the second plurality of layers of yarns on several layers or conversely. The three-dimensional weaving of the filling part fiber preform can be carried out with an interlock-type weave with several layers of warp yarns and weft yarns. A three-dimensional weaving with interlock weave is a weaving in which each warp yarn connects several layers of weft yarns together, the paths of the warp yarns being identical. The prism-shaped profile of the central sections is obtained by addition/removal of one or several layers of warp and weft yarns. Other three-dimensional weaving modes can be envisaged, such as for example multi-layer weavings with multi-satin or multi-plain weaves. Weaves of this type are described in document US 2010/0144227. The fiber bundles extending from the central section may correspond to continuous yarns woven together in a three-dimensional weaving (e.g. braiding) or two-dimensional weaving. The yarns of the fiber bundles can also be grouped together by wrapping or left loose.

As illustrated in FIGS. 6A to 6C, the first and second filling part fiber preforms 40 and 50 are placed respectively on the side of the outer face 12 and on the side of the inner face 11 by placing the central sections 41 and 51 in the volume 37 of the recessed section 30 and the bundles in the main grooves and their branching into secondary bundles in the secondary grooves.

Figure 7A:
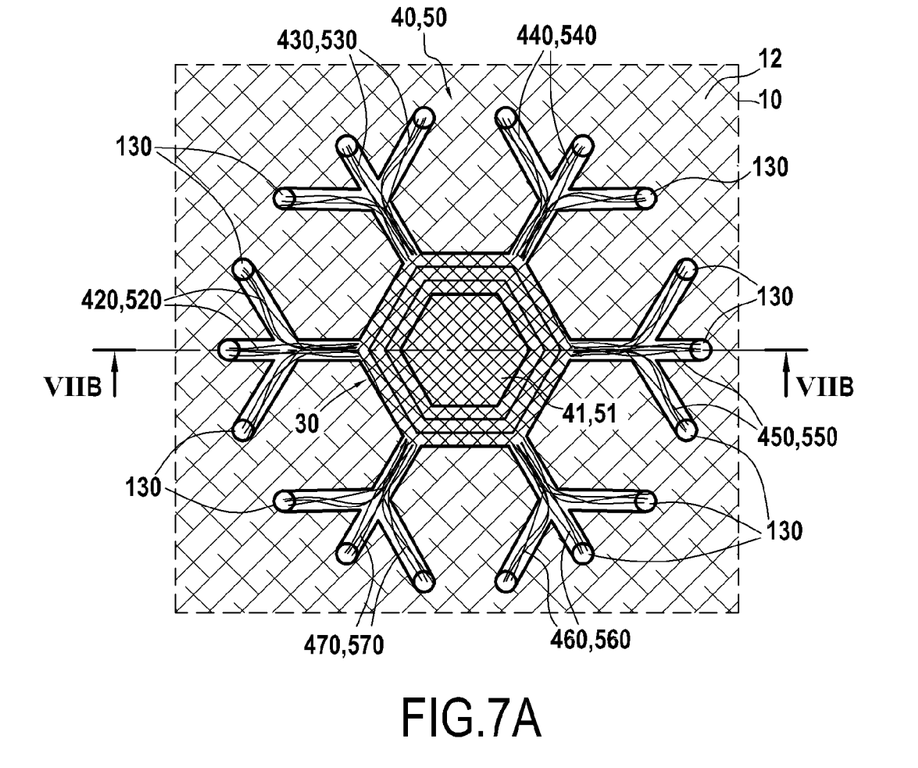
FIG. 7A is a top view representing the outer face showing the placement of the fiber bundles of a fiber preform of FIG. 6A.
Figure 7B:
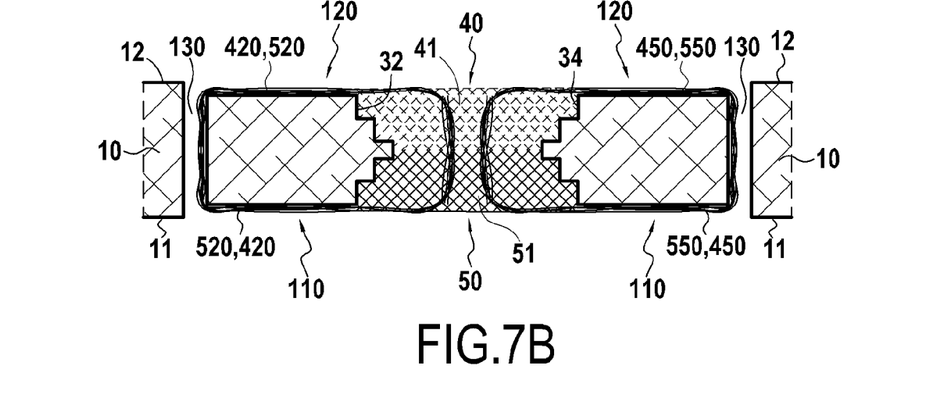
FIG. 7B is a radial sectional view showing the placement of the fiber bundles of each fiber preform of FIGS. 6A and 6B.

Once the fiber preforms 40 and 50 are thus set up, the fiber bundles, here the secondary bundles 421 to 471 and 521 to 571, are introduced into the orifices 130 as represented in FIGS. 7A, 7B and 7C.

In the example described here and according to a particular characteristic of the invention, the fiber bundles of the first preform 40, here the secondary bundles 421 to 471, after having passed through the orifices 130 emerge on the inner face 11, run along the grooves present on this face and are introduced into the central section 51 of the second fiber preform 50 (FIG. 7B). Likewise, the fiber bundles of the second preform 50, here the secondary bundles 521 to 571, after having passed through the orifices 130 emerge on the outer face 12, run along the grooves present on this face and are introduced into the central section 41 of the first fiber preform 40.

The two fiber preforms 40 and 50 are then densified with a matrix. The densification of the preforms consists in filling their porosity, in all or part of their volume, with the material constituting the matrix. The matrix can be obtained in a manner known per se by liquid process.

The liquid process consists in impregnating the preforms with a liquid composition containing an organic precursor of the material of the matrix. The organic precursor is usually in the form of a polymer, such as a resin, optionally diluted in a solvent. The composite material part and the filling part preforms are placed in a mold that can be closed in a sealed manner, the mold being able to correspond to the original mold of the part or to a partial mold only resuming the shape of the area of the part to be repaired. Then, the liquid matrix precursor, for example a resin, is injected into the entire housing to impregnate the entire fiber portion of the preforms.

The transformation of the precursor into an organic matrix, namely its polymerization, is carried out by heat treatment, generally by heating of the mold, after removal of any solvent and crosslinking of the polymer, the preforms still being kept in the mold. The organic matrix can in particular be obtained from epoxy resins, such as, for example, the high-performance epoxy resin sold, or from liquid precursors of carbon or ceramic matrices.

In the case of the formation of a carbon or ceramic matrix, the heat treatment consists in pyrolyzing the organic precursor to transform the organic matrix into a carbon or ceramic matrix depending on the precursor used and the pyrolysis conditions. For example, liquid carbon precursors can be resins with a relatively high coke content, such as phenolic resins, while liquid ceramic precursors, in particular SiC, can be polycarbosilane (PCS) or polytitanocarbosilane (PTCS) or polysilazane (PSZ) type resins. Several consecutive cycles, from impregnation to heat treatment, can be carried out to achieve the desired degree of densification.

The densification of the filling part preforms can be carried out by the well-known transfer molding process called RTM (Resin Transfert Molding). In accordance with the RTM process, the part to be repaired is placed with the filling part preforms in a mold having the shape of the part to be produced. A thermosetting resin is injected into the inner space which comprises the preforms. A pressure gradient is generally established in this inner space between the place where the resin is injected and the orifices for discharging it in order to control and optimize the impregnation of the reinforcement by the resin.

The resin used can be, for example, an epoxy resin. The resins suitable for the RTM processes are well known. They preferably have a low viscosity to facilitate their injection into the fibers. The choice of the temperature class and/or of the chemical nature of the resin is determined based on the thermo-mechanical stresses to which the part must be subjected. Once the resin has been injected into the whole reinforcement, it is polymerized by heat treatment in accordance with the RTM process.

The resin injected into the filling part preforms is preferably identical to the one used to manufacture the composite material part. However, it is possible to use a different resin for the repair but which has crosslinking and/or polymerization temperature levels compatible with the matrix already present in the part to be repaired.

Figure 8A:
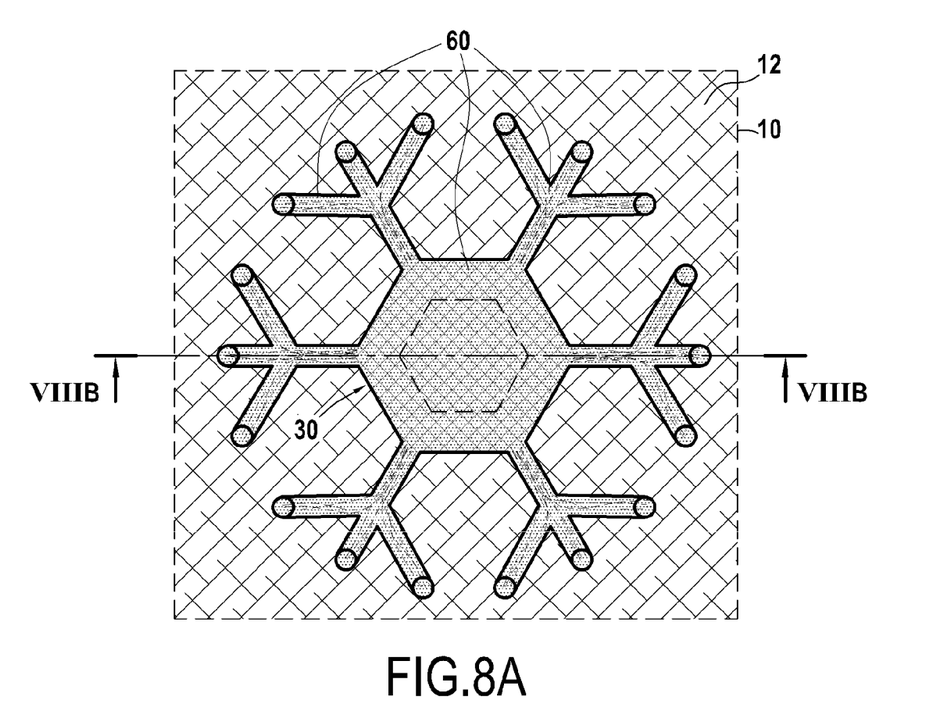
FIG. 8A is a top view representing an outer face showing the completion of a filling part in the fan casing.
Figure 8B:
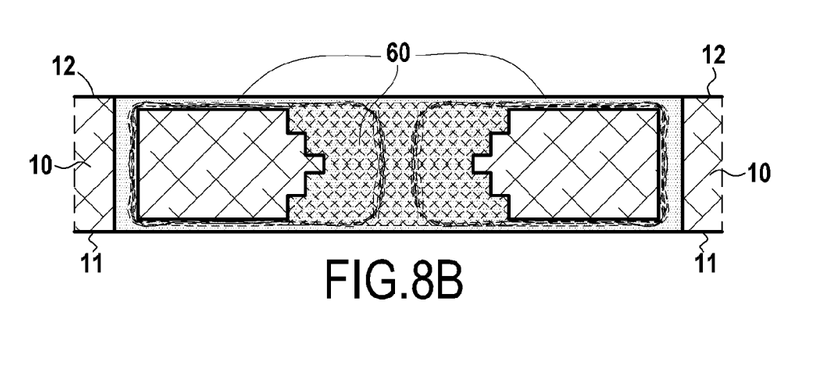
FIG. 8B is a radial sectional view showing the completion of a filling part in the fan casing.

After injection and polymerization, the part or a portion thereof is demolded. In the end, the part can be deburred by sanding with a soft abrasive, preferably by manual sanding with an abrasive paper such as GRIT 220 in order to smooth the surface of the repaired portion with the rest of the intact surface of the part. A composite material part is then obtained, here a fan casing 10, comprising a filling part 60 consisting of a fiber reinforcement corresponding to the two fiber preforms 40 and 50 densified by a matrix.

Figure 9:
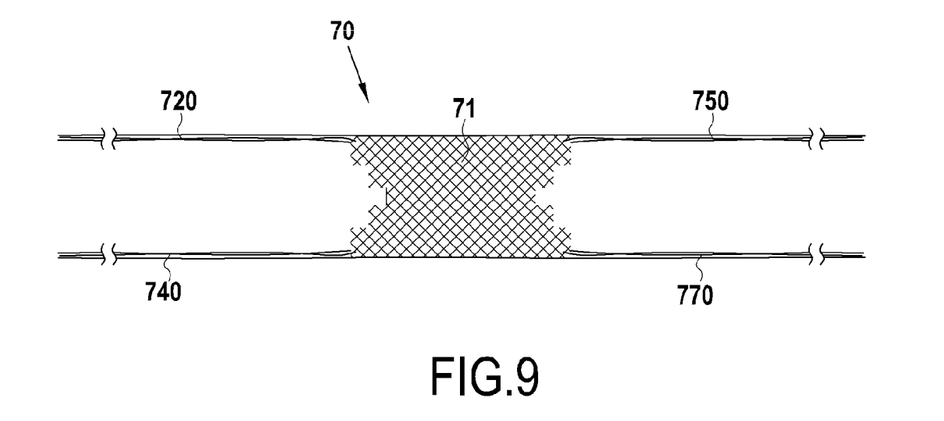
FIG. 9 is a sectional view showing a fiber preform of a filling part according to another embodiment of the invention.

In the example described above, the fiber reinforcement of the filling part is obtained from a first and a second fiber preform. However, in accordance with the invention, the fiber reinforcement of the filling part can also be obtained from a single fiber preform. FIG. 9 illustrates a fiber preform 70 which can be used to form a filling part instead of the first and second fiber preforms 40 and 50 previously described. The fiber preform 70 is produced in one piece and has a shape and dimensions allowing its integration into the area to be repaired of the casing 10 as represented in FIGS. 5A and 5B, namely after formation of the recessed section 30, of the grooves 110 and 120 (main and secondary grooves) and of the orifices 130.

More specifically, the fiber preform 70 comprises a central section 71 having a shape corresponding to the shape of the recessed section 30, the central section 71 being intended to fill the whole of the free volume 37 delimited by the recessed section 30 (FIG. 5B). The fiber preform 70 also comprises fiber bundles 720, 740, 750 and 770 which are intended to be placed in the main grooves of the pluralities of grooves 110 and 120, these main bundles then being subdivided respectively into secondary bundles which are intended to be placed in the secondary grooves as well as in the orifices 130. The preform 70 is obtained by three-dimensional weaving.

Figure 10:
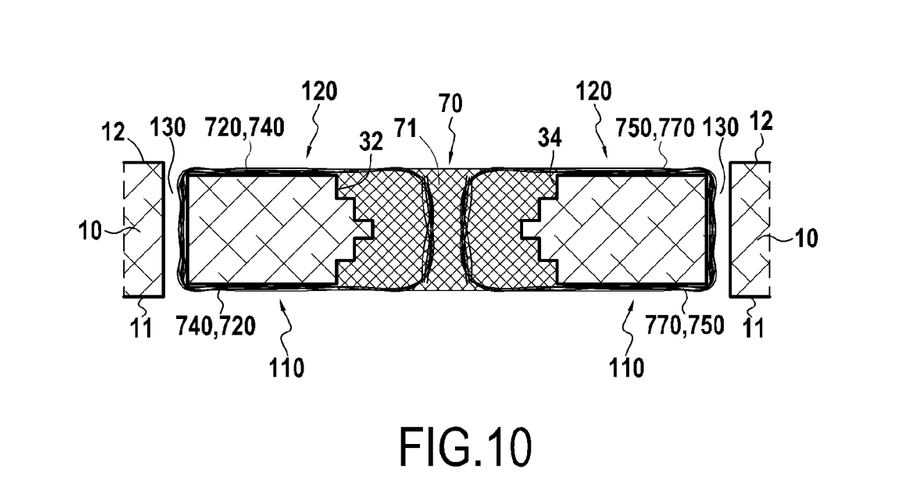
FIG. 10 is a radial sectional view showing the placement of the fiber bundles of the preform of FIG. 9.

As illustrated in FIG. 10, the filling part fiber preform 70 is set up by placing the central section 71 in the volume 37 of the recessed section 30, the central section being able to be deformed in order to allow its placement in the volume 37. The fiber bundles are placed in the main grooves and their branching into secondary bundles in the secondary grooves as already explained above for the preforms 40 and 50.

Once the fiber preform 70 is thus set up, the fiber bundles, here the bundles 720, 740, 750 and 770, are introduced into the orifices 130 as represented in FIG. 10.

In the example described here and according to a particular characteristic of the invention, a first portion of the fiber bundles of the preform 70, here the bundles 720 and 750, after having passed through the orifices 130 emerge on the inner face 11, run along the grooves present on this face and are introduced into the central section 71 of the fiber preform 70. Likewise, a second portion of the fiber bundles of the preform 70, here the bundles 740 and 770, after having passed through the orifices 130 emerge on the outer face 12, run along the grooves present on this face and are introduced into the central section 71 of the fiber preform 70.

The densification of the fiber preform 70 is then carried out in the same manner as the one described above for the first and second fiber preforms 40 and 50 and is not repeated once again here for the sake of simplification.

The invention claimed is:

1. A method for repairing a part made of composite material comprising a fiber reinforcement having a three-dimensional weaving between a plurality of warp yarns and a plurality of weft yarns, said fiber reinforcement being densified by a matrix, the method comprising:
    identifying at least one damaged area in the part,
    producing a recessed section by removal of the composite material at the damaged area so as to form a recessed section extending from a first face of the composite material part to a second face of said part,
    producing a first plurality of grooves extending on the first face of the composite material part from the edge(s) of the recessed section, producing a second plurality of grooves extending on the second face of the composite material part from the edge(s) of the recessed section, producing a plurality of orifices within a thickness of the composite material part, each orifice opening out both into a groove of the first plurality of grooves and into a groove of the second plurality grooves, three-dimensional weaving of at least one filling part fiber preform comprising a central section having a shape corresponding to the shape of the recessed section and a plurality of fiber bundles extending from the central section, placing the central section of said at least one filling part fiber preform in a free volume of the composite material part delimited by the recessed section of the part, placing a first portion of the fiber bundles of said at least one preform in the grooves of the first plurality of grooves present on the first face of the part and in the orifices of the plurality of orifices such that the fiber bundles of the first portion of the fiber bundles of said at least one preform open out into the grooves of the second plurality of grooves, placing a second portion of the fiber bundles of said at least one preform in the grooves of the second plurality of grooves present on the second face of the part and in the orifices of the plurality of orifices such that the fiber bundles of the second portion of fiber bundles of said at least one preform open out into the grooves of the first plurality of grooves, impregnating said at least one fiber preform with a precursor resin of a matrix, transforming the resin into a matrix in order to obtain a filling part made of composite material comprising a fiber reinforcement densified by a matrix, said filling part occupying the volume defined by the recessed section.

2. The repair method according to claim 1, comprising:

three-dimensional weaving of a first filling part fiber preform comprising a central section having a shape corresponding to the shape of the recessed section on the side of the first face of the composite material part and a plurality of fiber bundles extending from the central section, three-dimensional weaving of a second filling part fiber preform comprising a central section having a shape corresponding to the shape of the recessed section on the side of the second face of the composite material part and a plurality of fiber bundles extending from the central section, placing the central section of the first filling part fiber preform in a portion of the free volume of the composite material part delimited by the recessed section and present on the side of the first face of the part and of the fiber bundles in the grooves of the first plurality of grooves present on the first face of the part and in the orifices of the plurality of orifices such that the fiber bundles of the first preform open out into the grooves of the second plurality of grooves, placing the central section of the second filling part fiber preform in another portion of the free volume of the composite material part delimited by the recessed section and present on the side of the second face of the part and of the fiber bundles in the grooves of the second plurality of grooves present on the second face of the part and in the orifices of the plurality of orifices such that the fiber bundles of the second preform open out into the grooves of the first plurality of grooves.

3. The repair method according to claim 2, wherein the production of the recessed section comprises the formation of facing edges each comprising first and second bevels, the central section of the first filling part fiber preform having a geometry complementary to a portion of the volume of the recessed section defined between the first bevels of the facing edges and the central section of the second filling part fiber preform having a geometry complementary to the other portion of the volume of the recessed section defined between the second bevels of the facing edges.

4. The method according to claim 3, wherein the recessed section has a polygonal shape, the grooves of the first plurality of grooves each extending from a vertex of the polygon formed by the recessed section on the first face of the composite material part, the grooves of the second plurality of grooves each extending from a vertex of the polygon formed by the recessed section on the second face of the composite material part.

5. The repair method according to claim 3, wherein the first and second pluralities of grooves each comprise main grooves extending from the edges of the recessed section opening out respectively onto the first and second faces of the composite material part and secondary grooves extending from each main groove, at least part of the orifices of the plurality of orifices opening out both into a secondary groove of the first plurality of grooves and into a secondary groove of the second plurality of grooves.

6. The repair method according to claim 2, further comprising the introduction of the fiber bundles of the first filling part fiber preform into the central section of the second fiber preform and the introduction of the fiber bundles of the second filling part fiber preform into the central section of the first fiber preform.

7. A part made of composite material comprising a fiber reinforcement having a three-dimensional weaving between a plurality of warp yarns and a plurality of weft yarns, said fiber reinforcement being densified by a matrix, wherein the fiber reinforcement densified by the matrix includes at least one recessed section extending from a first face of the composite material part to a second face of said part, a filling part made of composite material is present in a free volume of the composite material part delimited by said at least one recessed section, the composite material part comprising a first plurality of grooves extending on the first face of said part from edge(s) of the recessed section opening out onto the first face and a second plurality of grooves extending on the second face of said part from the edge(s) of the recessed section opening out onto the second face, the composite material part further comprising a plurality of orifices extending within the thickness of the composite material part, each orifice opening out both into a groove of the first plurality of grooves and into a groove of the second plurality of grooves, the filling part comprising at least one filling part fiber preform comprising a central section present within the volume of the recessed section and a plurality of fiber bundles extending from the central section, the central section of said at least one preform having a three-dimensional weaving, a first portion of the fiber bundles of said at least one fiber preform being present in the grooves of the first plurality of grooves present on the first face of the composite material part and in the orifices of the plurality of orifices such that the fiber bundles of the first portion of fiber bundles of said at least one preform open out into the grooves of the second plurality of grooves, a second portion of the fiber bundles of said at least one fiber preform being present in the grooves of the second plurality of grooves present on the second face of the composite material part and in the orifices of the plurality of orifices such that the fiber bundles of the second portion of fiber bundles of said at least one preform open out into the grooves of the first plurality of grooves.

8. The part according to claim 7, wherein the filling part comprises first and second filling part fiber preforms each comprising a central section present in a portion of the volume of the recessed section and a plurality of fiber bundles extending from the central section, the central section of each preform having a three-dimensional weaving, the fiber bundles of the first fiber preform being present in the grooves of the first plurality of grooves present on the first face of the composite material part and in the orifices of the plurality of orifices such that the fiber bundles of the first preform open out into the grooves of the second plurality of grooves, the fiber bundles of the second fiber preform being present in the grooves of the second plurality of grooves present on the second face of the composite material part and in the orifices of the plurality of orifices such that the fiber bundles of the second preform open out into the grooves of the first plurality of grooves.

9. The part according to claim 8, wherein the recessed section comprises facing edges each comprising first and second bevels, the central section of the first filling part fiber preform having a geometry complementary to a portion of the volume of the recessed section defined between the first bevels of the facing edges and the central section of the second filling part fiber preform having a geometry complementary to the other portion of the volume of the recessed section defined between the second bevels of the facing edges.

10. The part according to claim 9, wherein the recessed section has a polygonal shape, the grooves of the first plurality of grooves each extending from a vertex of the polygon formed by the recessed section on the first face of the composite material part, the grooves of the second plurality of grooves each extending from a vertex of the polygon formed by the recessed section on the second face of the composite material part.

11. The part according to claim 9, wherein the first and second pluralities of grooves each comprise main grooves extending from the edges of the recessed section opening out respectively onto the first and second faces of the composite material part and secondary grooves extending from each main groove, at least one portion of the orifices of the plurality of orifices opening out both into a secondary groove of the first plurality of grooves and into a secondary groove of the second plurality of grooves.

12. The part according to claim 6, wherein the fiber bundles of the first filling part fiber preform extend in the central section of the second fiber preform and the fiber bundles of the second filling part fiber perform extend in the central section of the first fiber preform.

13. The part according to claim 7, wherein said part corresponds to a casing of an aeronautical gas turbine engine.

14. An aeronautical gas turbine engine having a casing according to claim 13.

15. An aircraft comprising one or several engines according to claim 14.

* * * * *